US012793196B2

(12) United States Patent
Singh

(10) Patent No.: US 12,793,196 B2
(45) Date of Patent: Nov. 10, 2026

(54) SYSTEM AND METHOD FOR POWERLINE INSPECTION

(71) Applicant: Abhinav Singh, New Castle, WA (US)

(72) Inventor: Abhinav Singh, New Castle, WA (US)

( * ) Notice: Subject to any disclaimer, the term of this patent is extended or adjusted under 35 U.S.C. 154(b) by 164 days.

(21) Appl. No.: 18/773,638

(22) Filed: Jul. 16, 2024

(65) Prior Publication Data

US 2025/0029224 A1 Jan. 23, 2025

Related U.S. Application Data

(60) Provisional application No. 63/527,334, filed on Jul. 18, 2023.

(51) Int. Cl.

| | |
|---|---|
| ***G01N 23/00*** | (2006.01) |
| ***G01N 23/04*** | (2018.01) |
| ***G01N 23/083*** | (2018.01) |
| ***G01N 23/18*** | (2018.01) |
| ***G05D 1/222*** | (2024.01) |
| ***G06T 7/00*** | (2017.01) |
| ***H02G 1/02*** | (2006.01) |
| ***H04N 23/30*** | (2023.01) |
| *G05D 105/80* | (2024.01) |
| *G05D 109/20* | (2024.01) |

(52) U.S. Cl.

CPC ........... *G06T 7/0002* (2013.01); *G01N 23/04* (2013.01); *G01N 23/083* (2013.01); *G01N 23/18* (2013.01); *G05D 1/222* (2024.01); *H02G 1/02* (2013.01); *H04N 23/30* (2023.01); *G01N 2223/401* (2013.01); *G05D 2105/89* (2024.01); *G05D 2109/20* (2024.01); *G06T 2207/10116* (2013.01)

(58) Field of Classification Search

CPC ............. G01N 2223/401; G01N 23/04; G01N 23/083; G01N 23/18; G06T 2207/10116; G06T 7/0002; G06T 7/0004; B64U 2101/26; B64U 10/10; G05D 2109/20; G05D 1/222; G05D 2105/89

See application file for complete search history.

(56) References Cited

U.S. PATENT DOCUMENTS

2007/0257197 A1* 11/2007 Gordon, III ............. G01T 7/00 250/370.11

2014/0126695 A1* 5/2014 Stock ..................... G01N 23/04 378/58

* cited by examiner

*Primary Examiner* — Dani Fox

(74) *Attorney, Agent, or Firm* — Jose Cherson Weissbrot

(57) ABSTRACT

Disclosed is a system including a user device, a frame, a drone, and a server. The user device enables a user to aviate the drone that is adapted to be detachably coupled to the frame. The frame is further adapted to be detachably coupled to the one or more powerlines, and includes an X-ray unit configured to capture X-ray images of the one or more powerlines. The X-ray unit transmits the X-ray images to the user device and the user device further transmits the X-ray images to the server in a digital imaging and communication in non-destructive evaluation (DICONDE) format. The server detects one or more abnormalities in the one or more powerlines by processing the X-ray images using a picture archiving & communication system (PACS) and an ADR technique, and generates data and/or reports to be viewed by the user by way of the user device.

11 Claims, 8 Drawing Sheets

SYSTEM AND METHOD FOR POWERLINE INSPECTION

TECHNICAL FIELD

The present disclosure relates generally to surveillance. More particularly, the present disclosure relates to a system and a method for powerline inspection.

BACKGROUND

Powerlines carry electrical energy between different locations. Regular usage, force and pressure on the powerlines along with wind, extreme climatic conditions, lack of maintenance etc. result in abnormalities in the powerlines such as broken spring fragments, detached core sleeves, cracks, voids, air pockets etc. that can cause failure. Thus, powerlines require timely inspection and maintenance.

Conventional methods for inspection and maintenance of powerline utilize bucket trucks and helicopters to perform X-ray-based inspection of the powerlines. Bucket truck-based X-Ray can only be performed where terrain is accessible and involves at least two personnel to hang the X-ray device manually on the powerlines for inspection. As of today, bucket truck-based X-ray is the standard method of x-ray imaging on de-energized lines.

Using helicopters to perform X-ray-based inspection of the powerlines is inherently dangerous and expensive. This technique creates a lot of stress and pressure on the technicians. The X-ray device is generally mounted on a helicopter using a long line and has operational challenges due to uncontrolled spin, which makes placing the X-ray device on the powerlines very challenging. This method also increases the probability of false negatives (i.e., error in inspected data) and the image quality of the X-rays can be severely affected. Moreover, significant training is required for personnel to perform such dangerous inspections. This training is expensive and limits the number of personnel who may be qualified to perform such inspections.

Thus, a method for optimal powerline x-ray inspection is an ongoing effort, and demands a need for an improvised technical solution that overcomes the above-mentioned problems.

SUMMARY

In an aspect of the present disclosure, a system is disclosed. The system includes a frame adapted to be detachably coupled to one or more powerlines and includes at least one X-ray unit configured to capture one or more X-ray images of one or more powerlines. The system further includes processing circuitry that is coupled to the at least one X-ray unit and is configured to process the one or more X-ray images of the one or more powerlines by way of a picture archiving & communication system (PACS) and an assistive defect recognition (ADR) technique to determine one or more abnormalities associated with the one or more powerlines. The processing circuitry is further configured to generate a report based on the one or more abnormalities by way of the picture archiving & communication system (PACS).

In some aspects of the present disclosure, the system further includes a user device that is coupled to the at least one X-ray unit and the processing circuitry and configured to receive the one or more X-ray images and transmit the one or more X-ray images to the processing circuitry in a digital imaging and communication in non-destructive evaluation (DICONDE) format.

In some aspects of the present disclosure, the system further includes one or more unmanned aerial vehicles (UAVs) adapted to be detachably coupled to the frame and configured to aviate the frame to reach a vicinity of the one or more powerlines and detachably couple the frame to the one or more powerlines.

In some aspects of the present disclosure, the user device is further configured to enable a user to provide instructions to the one or more UAVs to reach near the vicinity of the one or more powerlines to detachably couple the frame to the one or more powerlines.

In some aspects of the present disclosure, the user device is further configured to receive the report.

In some aspects of the present disclosure, the one or more abnormalities include one of, broken spring fragments, detached core sleeves, spiral fractures, implosive splice fracture, cracks, voids, missing grease, or air pockets.

In some aspects of the present disclosure, the at least one X-ray unit further includes at least one X-ray generator that is configured to generate a plurality of X-rays and transmit the plurality of X-rays to the one or more power lines.

In some aspects of the present disclosure, the at least one X-ray unit further includes at least one digital detector that is configured to capture the plurality of X-rays passed through the one or more power lines and generate the one or more X-ray images in the digital imaging and communication in non-destructive evaluation (DICONDE) format.

In some aspects of the present disclosure, the frame further includes an insulation portion that is adapted to be coupled to the at least one X-ray generator and a metal frame portion that is adapted to be coupled to the at least one digital detector.

In another aspect of the present disclosure, a system is disclosed. The system includes a frame comprising at least one X-ray unit configured to capture one or more X-ray images of the one or more powerlines, one or more unmanned aerial vehicles (UAVs), and processing circuitry coupled to each other. The frame is adapted to be detachably coupled to one or more powerlines. The one or more UAVs is adapted to be detachably coupled to the frame, and configured to aviate the frame to reach a vicinity of the one or more powerlines and detachably couple the frame to the one or more powerlines. The processing circuitry is configured to process the one or more X-ray images by way of a picture archiving & communication system (PACS) and an assistive defect recognition (ADR) technique to determine one or more abnormalities associated with the one or more powerlines. Furthermore, the processing circuitry is configured to generate a report based on the one or more abnormalities by way of the picture archiving & communication system (PACS).

In some aspects of the present disclosure, the system further includes a user device that is coupled to the at least one X-ray unit, the one or more UAVs, and the processing circuitry, and configured to receive the one or more X-ray images and transmit the one or more X-ray images to the processing circuitry in a digital imaging and communication in non-destructive evaluation (DICONDE) format.

In some aspects of the present disclosure, the user device is further configured to enable a user to provide instructions to the one or more UAVs to reach near the vicinity of the one or more powerlines to detachably couple the frame to the one or more powerlines.

In some aspects of the present disclosure, the user device is further configured to receive the report.

In some aspects of the present disclosure, the one or more abnormalities include one of, broken spring fragments, detached core sleeves, spiral fractures, implosive splice fracture, cracks, voids, missing grease, or air pockets.

In some aspects of the present disclosure, the at least one X-ray unit includes at least one X-ray generator that is configured to generate a plurality of X-rays and transmit the plurality of X-rays to the one or more power lines.

In some aspects of the present disclosure, the at least one X-ray unit further includes at least one digital detector that is configured to capture the plurality of X-rays passed through the one or more power lines and generate the one or more X-ray images in the DICONDE format.

In some aspects of the present disclosure, the frame further includes an insulation portion that is adapted to be coupled to the at least one X-ray generator and a metal frame portion that is adapted to be coupled to the at least one digital detector.

In yet another aspect of the present disclosure, a computer-implemented method is disclosed. The method includes aviating, by way of one or more unmanned aerial vehicles (UAVs) detachably coupled to a frame, the frame to reach a vicinity of the one or more powerlines for coupling the frame to the one or more powerlines and detachably couple the frame to the one or more powerlines wherein the frame comprising at least one X-ray unit configured to capture one or more X-ray images of the one or more powerlines. Further, the method includes processing, by way of processing circuitry coupled to the one or more UAVs and the least one X-ray unit, the one or more X-ray images via a picture archiving & communication system (PACS) and an assistive defect recognition (ADR) technique. Further, the method includes determining, by way of the processing circuitry, one or more abnormalities associated with the one or more powerlines via a picture archiving & communication system (PACS) and the assistive defect recognition (ADR) technique. Furthermore, the method includes generating, by way of the processing circuitry, a report based on the one or more abnormalities via the picture archiving & communication system (PACS).

In some aspects of the present disclosure, the method includes instructing, by way of a user device coupled to the at least one X-ray unit, the one or more unmanned aerial vehicles and the processing circuitry, to aviate the frame to reach near the vicinity of the one or more powerlines to detachably couple the frame to the one or more powerlines. Further, the method includes receiving, by way of the user device, the one or more X-ray images. Furthermore, the method includes transmitting, by way of the user device, the one or more X-ray images to the processing circuitry in a digital imaging and communication in non-destructive evaluation (DICONDE) format.

In some aspects of the present disclosure, the method includes receiving, by way of the user device, the report.

BRIEF DESCRIPTION OF DRAWINGS

The above and still further features and advantages of aspects of the present disclosure becomes apparent upon consideration of the following detailed description of aspects thereof, especially when taken in conjunction with the accompanying drawings, and wherein.

To facilitate understanding, like reference numerals have been used, where possible, to designate like elements common to the figures.

DETAILED DESCRIPTION

Figure 1:
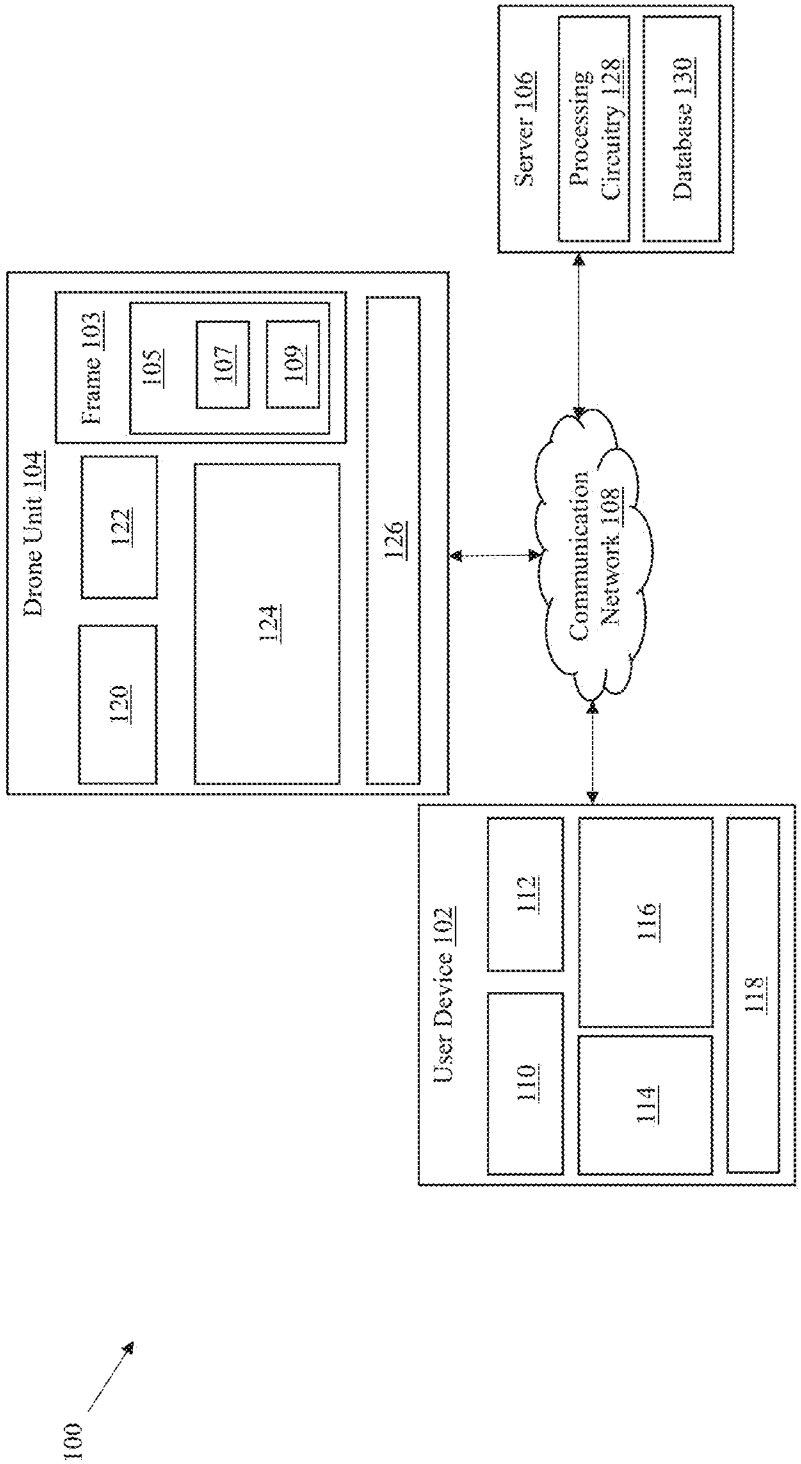
FIG. 1 illustrates a block diagram of a system for powerline inspection, in accordance with an exemplary aspect of the present disclosure.

Various aspects of the present disclosure provide a system and a method for powerline inspection. The following description provides specific details of certain aspects of the disclosure illustrated in the drawings to provide a thorough understanding of those aspects. It should be recognized, however, that the present disclosure can be reflected in additional aspects and the disclosure may be practiced without some of the details in the following description.

The various aspects including the example aspects are now described more fully with reference to the accompanying drawings, in which the various aspects of the disclosure are shown. The disclosure may, however, be embodied in different forms and should not be construed as limited to the aspects set forth herein. Rather, these aspects are provided so that this disclosure conveys the scope of the disclosure to those skilled in the art. In the drawings, the sizes of components may be exaggerated for clarity.

It is understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

The subject matter of example aspects, as disclosed herein, is described with specificity to meet statutory requirements. However, the description itself is not intended to limit the scope of this patent. Rather, the inventor/inventors have contemplated that the subject matter might also be embodied in other ways, to include different features or combinations of features similar to the ones described in this document, in conjunction with other technologies.

As mentioned, there remains a need for a system and a method for powerline inspection. The present aspect, therefore: provides a system and a method for powerline inspection. Generally, the various aspects including the example aspects relate to the system, and the method for powerline inspection.

The aspects herein and the various features and advantageous details thereof are explained more fully with reference to the non-limiting aspects that are illustrated in the accompanying drawings and detailed in the following description. Descriptions of well-known components and processing techniques are omitted so as to not unnecessarily obscure the aspects herein. The examples used herein are intended merely to facilitate an understanding of ways in which the aspects herein may be practiced and to further enable those of skill in the art to practice the aspects herein. Accordingly, the examples should not be construed as limiting the scope of the aspects herein.

FIG. 1 illustrates a block diagram of a system 100 for powerline inspection, in accordance with an aspect of the present disclosure.

The system 100 may include a user device 102, a frame 103, one or more unmanned aerial vehicles 104, and a server 106, which may be communicatively coupled to each other by way of a communication network 108. In some aspects of the present disclosure, the user device 102, the frame 103, the drone unit 104, and the server 106 may be communicatively coupled to each other through one or more wired and/or wireless communication networks established therebetween.

The user device 102 may be configured to generate and enable a user to provide instructions to control each unmanned aerial vehicle of the one or more unmanned aerial vehicles 104 (hereinafter referred as "the drone unit 104"). In some aspects of the present disclosure, the user device 102 may facilitate the user to control one or more of, the functionality, movement, and operations of the drone unit 104. Specifically, the user device 102 may be configured to actuate the drone unit 104 such that the drone unit 104 aviates and reaches near vicinity of one or more powerlines (not shown). The one or more powerlines may include energized powerlines and/or de-energized powerlines. Examples of energized powerlines may include but are not limited to ACSR (Aluminum Conductor Steel Reinforced cable), ACCR (Aluminum Conductor Composite Reinforced cable), AAAC (All Aluminum Alloy Conductor), or any combination thereof.

In an aspect of the present disclosure, the user device 102 may include a user interface 110, a device processing unit 112, a device memory 114, an inspection console 116, and a first communication interface 118.

The user interface 110 may include an input interface (not shown) for receiving inputs from the user. Examples of the input interface of the user interface 110 may include but are not limited to, a touch interface, a mouse, a keyboard, a motion recognition unit, a gesture recognition unit, a voice recognition unit, or the like. Aspects of the present disclosure are intended to include or otherwise cover any type of the input interface including known, related art, and/or later developed technologies. The user interface 110 may further include an output interface (not shown) for displaying (or presenting) an output to the user. Examples of the output interface of the user interface 110 may include but are not limited to, a digital display, an analog display, a touch screen display, a graphical user interface, a website, a web page, a keyboard, a mouse, a light pen, an appearance of a desktop, and/or illuminated characters. Aspects of the present disclosure are intended to include and/or otherwise cover any type of the output interface including known and/or related, or later developed technologies.

The device processing unit 112 may include suitable logic, instructions, circuitry, interfaces, and/or codes for executing various operations, such as the operations associated with the user device 102, and the like. In some aspects of the present disclosure, the device processing unit 112 may utilize one or more processors such as Arduino or raspberry pi or the like. Further, the device processing unit 112 may be configured to control one or more operations executed by the user device 102 in response to the input received at the user interface 110 from the user. Examples of the device processing unit 112 may include, but are not limited to, an application-specific integrated circuit (ASIC) processor, a reduced instruction set computing (RISC) processor, a complex instruction set computing (CISC) processor, a field-programmable gate array (FPGA), a Programmable Logic Control unit (PLC), and the like. Aspects of the present disclosure are intended to include or otherwise cover any type of processing unit including known, related art, and/or later developed processing units.

The device memory 114 may be configured to store the logic, instructions, circuitry, interfaces, and/or codes of the device processing unit 112, data associated with the user device 102, and data associated with the system 100. Examples of the device memory 114 may include, but are not limited to, Read-Only Memory (ROM), Random-Access Memory (RAM), flash memory, a removable storage drive, a hard disk drive (HDD), a solid-state memory, a magnetic storage drive, a Programmable Read Only Memory (PROM), an Erasable PROM (EPROM), and/or an Electrically EPROM (EEPROM). Aspects of the present disclosure are intended to include or otherwise cover any type of device memory including known, related art, and/or later developed memories.

The inspection console 116 may be configured as a computer-executable application, to be executed by the device processing unit 112. The inspection console 116 may include suitable logic, instructions, and/or codes for executing various operations and may be controlled by the server 106. The one or more computer-executable applications may be stored in the device memory 114. Examples of the one or more computer-executable applications may include, but are not limited to, an audio application, a video application, a social media application, a navigation application, or the like. Aspects of the present disclosure are intended to include or otherwise cover any type of computer-executable application including known, related art, and/or later developed computer-executable applications.

The first communication interface 118 may be configured to enable the user device 102 to communicate with at least one X-ray unit 105 coupled to the frame 103, the drone unit 104 and the server 106 over the communication network 108. Examples of the first communication interface 118 may include, but are not limited to, a modem, a network interface such as an Ethernet card, a communication port, and/or a Personal Computer Memory Card International Association (PCMCIA) slot and card, an antenna, a radio frequency (RF) transceiver, one or more amplifiers, a tuner, one or more oscillators, a digital signal processor, a coder-decoder (CODEC) chipset, a subscriber identity module (SIM) card, and a local buffer circuit. It will be apparent to a person of ordinary skill in the art that the first communication interface 118 may include any device and/or apparatus capable of providing wireless or wired communications between the user device 102 and the X-ray unit 105, the drone unit 104, or the server 106.

The frame 103 may be adapted to be detachably coupled to the one or more powerlines. Specifically, the frame 103 may be adapted to be detachably coupled to the drone unit 104. Further, the drone unit 104 may be configured to aviate and reach the vicinity of the one or more powerlines and adapted to detachably couple the frame to the one or more powerlines. The frame 103 may be further adapted to couple the at least one X-ray unit 105. The at least one X-ray unit 105 is configured to generate a plurality of X-rays and capture one or more X-ray images of the one or more powerlines. Specifically, the at least one X-ray unit 105 may be configured to generate the one or more X-ray images of the one or more powerlines by interactions of the one or more powerlines with the plurality of X-rays generated by the at least one X-ray unit 105. In some aspects of the present disclosure, the at least one X-ray unit 105 (hereinafter interchangeably referred as "the X-ray unit 105") may be controlled by the user by way of the one or more instructions transmitted by way of the user device 102 to generate the plurality of X-rays in the vicinity of the one or more powerlines. Further, the X-ray unit 105 may be configured to transmit the one or more X-ray images of the one or more powerlines to the server 106 via the user device 102. The X-ray unit 105 may further include at least one X-ray generator 107 (hereinafter referred as "the X-ray generator 107) and at least one digital detector 109 (hereinafter referred as "the digital detector 109). The at least one X-ray unit 105 may be configured to transmit the one or more X-ray images (hereinafter interchangeably referred as "the X-ray images") of the one or more powerlines (hereinafter interchangeably referred as "the powerlines") to the user device 102. Upon receiving the X-ray images, the user device 102 may be configured to send the X-ray images to the server 106 in a digital imaging and communication in non-destructive evaluation (DICONDE) format. Furthermore, the user device 102 may be configured to display (or present) data or reports of one or more abnormalities of the powerlines to the user. The one or more abnormalities may include but are not limited to broken spring fragments, detached core sleeves, spiral fractures, implosive splice fracture, cracks, voids, missing grease, air pockets, or any combination thereof.

In some aspects of the present disclosure, the frame 103 may be made up of a single metal throughout to bypass the current through the X-ray unit 105.

In some aspects, the metal may include any one of, aluminum, copper, steel, and titanium. Aspects of the present disclosure are intended to include and/or otherwise cover all the metals, without deviating from the scope of the present disclosure.

The drone unit 104 may be configured to aviate in accordance with the instructions received from the user by way of the user device 102 to reach the vicinity of the powerlines. In other words, the drone unit 104 may be flown in the vicinity of the powerlines by one or more instructions (i.e., real-time instructions) provided by the user by way of the user device 102. In some aspects of the present disclosure, the drone unit 104 may be adapted to be detachably coupled to the frame 103 such that the drone unit 104 may allow the frame 103 to detachably couple to the powerlines and facilitate efficient X-ray image capturing of the powerlines (explained in detail in FIG. 2).

In some aspects of the present disclosure, the drone unit 104 may include an aviation unit 120, a drone processing unit 122, a drone memory 124, and a second communication interface 126.

The aviation unit 120 may be configured to generate an upthrust for controlling the aviation of the drone unit 104 such that the drone may reach the vicinity of the powerlines. In some aspects of the present disclosure, the aviation unit 120 may be controlled by the user by way of the one or more instructions transmitted by way of the user device 102. In some aspects of the present disclosure, the aviation unit 120 may include one or more propellers (not shown), a battery unit (not shown), and a motor (not shown). The one or more propellers may be configured to generate the upthrust required for the aviation of the drone unit 104. The battery unit may be configured to provide electrical energy (in the form of electrical voltage and/or electrical current) for operation of components of the drone unit 104. The motor may be configured to generate a rotational motion to enable the motion of the one or more propellers. In some other aspects of the present disclosure, the aviation unit may include the one or more propellers (not shown), an engine (not shown), and a fuel source (not shown). The one or more propellers may be configured to generate the upthrust required for the aviation of the drone unit 104. The fuel source and the engine may be configured to generate and provide electrical energy (in the form of electrical voltage and/or electrical current) for the operation of the components of the drone unit 104.

The drone processing unit 122 may include suitable logic, instructions, circuitry, interfaces, and/or codes for executing various operations, such as the operations associated with the drone unit 104, and the like. In some aspects of the present disclosure, the drone processing unit 122 may utilize one or more processors such as Arduino or raspberry pi or the like. Further, the drone processing unit 122 may be configured to control one or more operations executed by the drone unit 104 in response to the input received at the user device 102 from the user. Examples of the drone processing unit 122 may include, but are not limited to, an application-specific integrated circuit (ASIC) processor, a reduced instruction set computing (RISC) processor, a complex instruction set computing (CISC) processor, a field-programmable gate array (FPGA), a Programmable Logic Control unit (PLC), and the like. Aspects of the present disclosure are intended to include or otherwise cover any type of processing unit including known, related art, and/or later developed processing units.

The drone memory 124 may be configured to store the logic, instructions, circuitry, interfaces, and/or codes of the drone processing unit 122, data associated with the drone unit 104, and data associated with the system 100. Examples of the drone memory 124 may include, but are not limited to, a Read-Only Memory (ROM), a Random-Access Memory (RAM), a flash memory, a removable storage drive, a hard disk drive (HDD), a solid-state memory, a magnetic storage drive, a Programmable Read Only Memory (PROM), an Erasable PROM (EPROM), and/or an Electrically EPROM (EEPROM). Aspects of the present disclosure are intended to include or otherwise cover any type of device memory including known, related art, and/or later developed memories.

The second communication interface 126 may be configured to enable the drone unit 104 to communicate with the user device 102 over the communication network 108. Examples of the second communication interface 126 may include, but are not limited to, a modem, a network interface such as an Ethernet card, a communication port, and/or a Personal Computer Memory Card International Association (PCMCIA) slot and card, an antenna, a radio frequency (RF) transceiver, one or more amplifiers, a tuner, one or more oscillators, a digital signal processor, a coder-decoder (CODEC) chipset, a subscriber identity module (SIM) card, and a local buffer circuit. It will be apparent to a person of ordinary skill in the art that the second communication interface 126 may include any device and/or apparatus capable of providing wireless or wired communications between the drone unit 104 and the user device 102.

The server 106 may be a network of computers, a software framework, or a combination thereof, that may provide a generalized approach to create the server implementation. Examples of the server 106 may include, but are not limited to, personal computers, laptops, mini-computers, mainframe computers, any non-transient and tangible machine that can execute a machine-readable code, cloud-based servers, distributed server networks, or a network of computer systems. The server 106 may be realized through various web-based technologies such as, but not limited to, a Java web-framework, a .NET framework, a personal home page (PHP) framework, or any web-application framework. The server 106 may be maintained by a storage facility management authority or a third-party entity that facilitates service enablement and resource allocation operations of the system 100. The server 106 may include the processing circuitry 128 and one or more memory units 130*a*-130*m* (hereinafter, collectively referred to and designated as "Database 130").

The server 106 by way of the processing circuitry 128 may be configured to determine the one or more abnormalities in the powerlines. In some aspects of the present disclosure, the server 106 by way of the processing circuitry 128 may be configured to process the X-ray images of the powerlines to determine the one or more abnormalities of the powerlines by implementing a picture archiving & communication system (PACS). In some other aspects of the present disclosure, the server 106 by way of the processing circuitry 128 may be configured to process the one or more X-ray images of the powerlines to determine the one or more abnormalities on the powerlines by using one or more artificial intelligence (AI) techniques. The server 106 by way of the processing circuitry 128 may further be configured to generate the data or the reports based on the one or more abnormalities of the powerlines. Furthermore, the server 106 by way of the processing circuitry 128 may be configured to share the data or the reports to the user device 102.

The processing circuitry 128 may include suitable logic, instructions, circuitry, interfaces, and/or codes for executing various operations of the system 100. The processing circuitry 128 may be configured to host and enable the inspection console 116 running on (or installed on) the user device 102 to execute the operations associated with the system 100 by communicating one or more commands and/or instructions over the communication network 108. Examples of the processing circuitry 128 may include, but are not limited to, an ASIC processor, a RISC processor, a CISC processor, a FPGA, and the like. Aspects of the present disclosure are intended to include or otherwise cover any type of the processing circuitry including known, related art, and/or later developed processing circuitries.

The processing circuitry 128 may further be configured to implement an Assisted Defect Recognition (ADR) techniques and a picture archiving & communication system (PACS) to identify one or more potential defects in the powerlines using one or more deep learning techniques. The PACS may store and share the X-ray images of the powerlines that facilitates in a collaborative review and analysis by concerned authorities (engineers, technicians etc.). The PACS and the ADR may therefore enhances the accessibility and utility of inspection data for informed decision-making and proactive maintenance strategies.

For example, during a routine inspection of a high-voltage transmission line, the ADR techniques implemented by the processing circuitry 128 may operate alongside the X-ray unit 105. As X-rays penetrate through the power lines, the ADR technique facilitates in analyzing the resulting images in real-time by identifying potential defects set within the software. Simultaneously, X-ray images are received, processed, and archived in the PACS. Upon detection of abnormalities by the implementation of the ADR techniques, the PACS categorizes and stores the X-ray images systematically, associating them with specific power line segments for easy retrieval and comparison. The concerned authorities or people, such as engineers and technicians access the stored X-ray images via the PACS, where they can review detailed analyses and reports generated by the PACS.

The database 130 may be configured to store the logic, instructions, circuitry, interfaces, and/or codes of the processing circuitry 128 for executing various operations. The database 130 may be further configured to store therein, data associated with the user registered with the system 100. Aspects of the present disclosure are intended to include and/or otherwise cover any type of the data associated with the system 100. In some aspects of the present disclosure, the database 130 may further be configured to store the data or the reports based on the one or more abnormalities on the powerlines generated by the processing circuitry 128. Examples of the database 130 may include but are not limited to, a ROM, a RAM, a flash memory, a removable storage drive, a HDD, a solid-state memory, a magnetic storage drive, a PROM, an EPROM, and/or an EEPROM. In some aspects, a set of centralized or distributed networks of peripheral memory devices may be interfaced with the server 106, as an example, on a cloud server. Aspects of the present disclosure are intended to include or otherwise cover any type of the database 130 including known, related art, and/or later developed databases.

The communication network 108 may include suitable logic, circuitry, and interfaces that may be configured to provide a plurality of network ports and a plurality of communication channels for transmission and reception of data related to operations of various entities (such as the user device 102, the X-ray unit 105, the drone unit 104, and the server 106) of the system 100. Each network port may correspond to a virtual address (or a physical machine address) for transmission and reception of the communication data. For example, the virtual address may be an Internet Protocol Version 4 (IPV4) (or an IPV6 address) and the physical address may be a Media Access Control (MAC) address. The communication network 108 may be associated with an application layer for implementation of communication protocols based on one or more communication requests from the user device 102, the X-ray unit 105, the drone unit 104, and the server 106. The communication data may be transmitted or received, via the communication protocols. Examples of the communication protocols may include, but are not limited to, Hypertext Transfer Protocol (HTTP), File Transfer Protocol (FTP), Simple Mail Transfer Protocol (SMTP), Domain Network System (DNS) protocol, Common Management Interface Protocol (CMIP), Transmission Control Protocol and Internet Protocol (TCP/IP), User Datagram Protocol (UDP), Long Term Evolution (LTE) communication protocols, or any combination thereof.

In an aspect of the present disclosure, the communication data may be transmitted or received via at least one communication channel of a plurality of communication channels in the communication network 108. The communication channels may include, but are not limited to, a wireless channel, a wired channel, a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a metropolitan area network (MAN), a satellite network, the Internet, a fiber optic network, a coaxial cable network, an infrared (IR) network, a radio frequency (RF) network, and a combination thereof. Aspects of the present disclosure are intended to include or otherwise cover any type of communication channel, including known, related art, and/or later developed technologies.

In operation, the system 100, by way of the user device 102, may be configured to aviate the drone unit 104 adapted to be detachably coupled with the frame 103 to reach the vicinity of the powerlines based on the one or more instructions provided by the user. Upon reaching the vicinity of the powerlines, the frame 103 may be adapted to detachably couple with the powerlines using the drone unit 104. Further, the system 100, by way of the X-ray unit 105, may be configured to generate the X-rays near the vicinity of the powerlines using the X-ray generator 107 of the X-ray unit 105. The system 100, by way of the X-ray unit 105, may be configured to capture the one or more X-ray images of the powerlines using the digital detector 109 of the X-ray unit 122. The system 100, by way of the user device 102 coupled to the X-ray unit 105, may further be configured to share the one or more X-ray images of the powerlines to the server 106. Upon sharing the one or more X-ray images, the system 100, by way of the server 106, may be configured to determine the one or more abnormalities in the powerlines by processing the one or more X-ray images of the powerlines using the picture archiving & communication system (PACS) and the assistive defect recognition (ADR) technique. The system 100, by way of the server 100 may further be configured to generate the data and/or the reports of the one or more abnormalities of the powerlines and transmit to the user device 102, that may facilitate the user to view the data and/or the reports of the one or more abnormalities in the powerlines.

Figure 2:
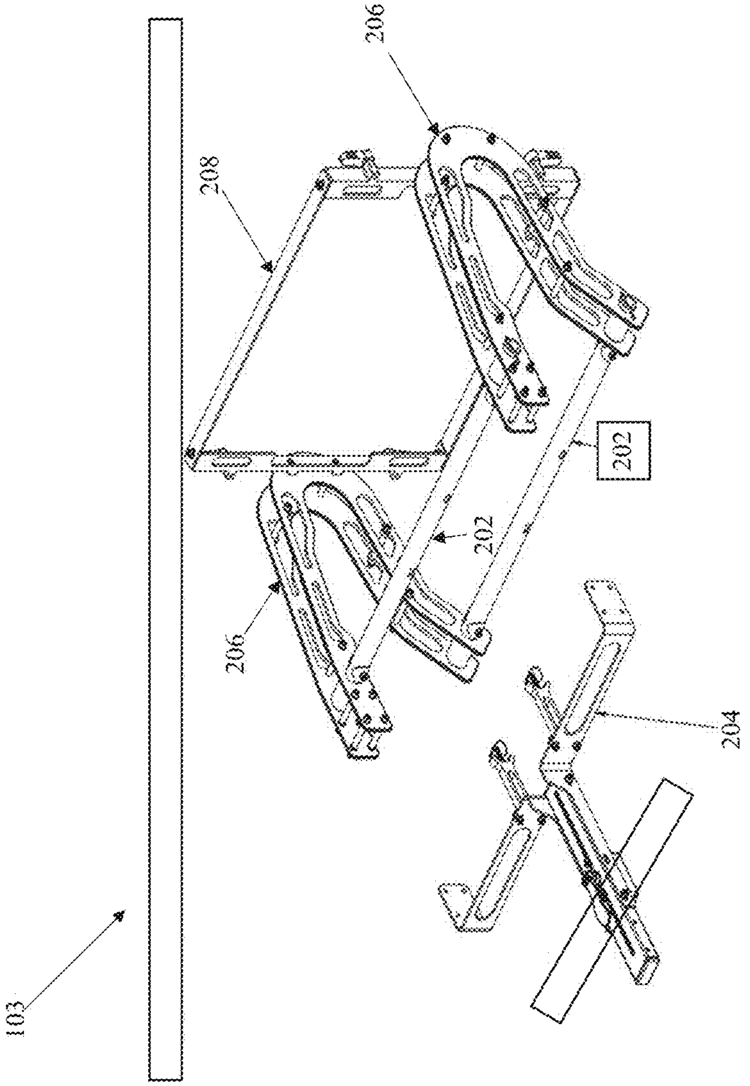
FIG. 2 illustrates a frame of the system of FIG. 1, in accordance with an aspect of the present disclosure.

FIG. 2 illustrates an exploded view of the frame 103 of the system 100 of FIG. 1, in accordance with an exemplary aspect of the present disclosure. The frame 103 may include a pair of insulation portions 202, and a pair of metal frame portion 206. The pair of insulation portions 202 may include one or more rod supports 302 (later shown in FIG. 3), a link 204 and a faraday cage 500 (later shown in FIG. 5). The pair of insulation portions 202 (hereinafter collectively referred as "the insulation portion 202") may be adapted to be detachably coupled with the X-ray generator 107. Specifically, the link 204 and the faraday cage 500 of the insulation portion 202 may be adapted to detachably couple the X-ray generator 107. The insulation portion 202 may be adapted to be disposed between the pair of metal frame portion 206 (hereinafter referred as "the metal frame portion 206). The metal frame portion 206 may be a U-shaped portion. The metal frame portion 206 may be adapted to be detachably coupled with the digital detector 109. The metal frame portion 206 may further facilitate firm attachment of the frame 103 with the powerlines while the X-ray unit 105 may be capturing the one or more X-ray images of the powerlines.

Figure 3:
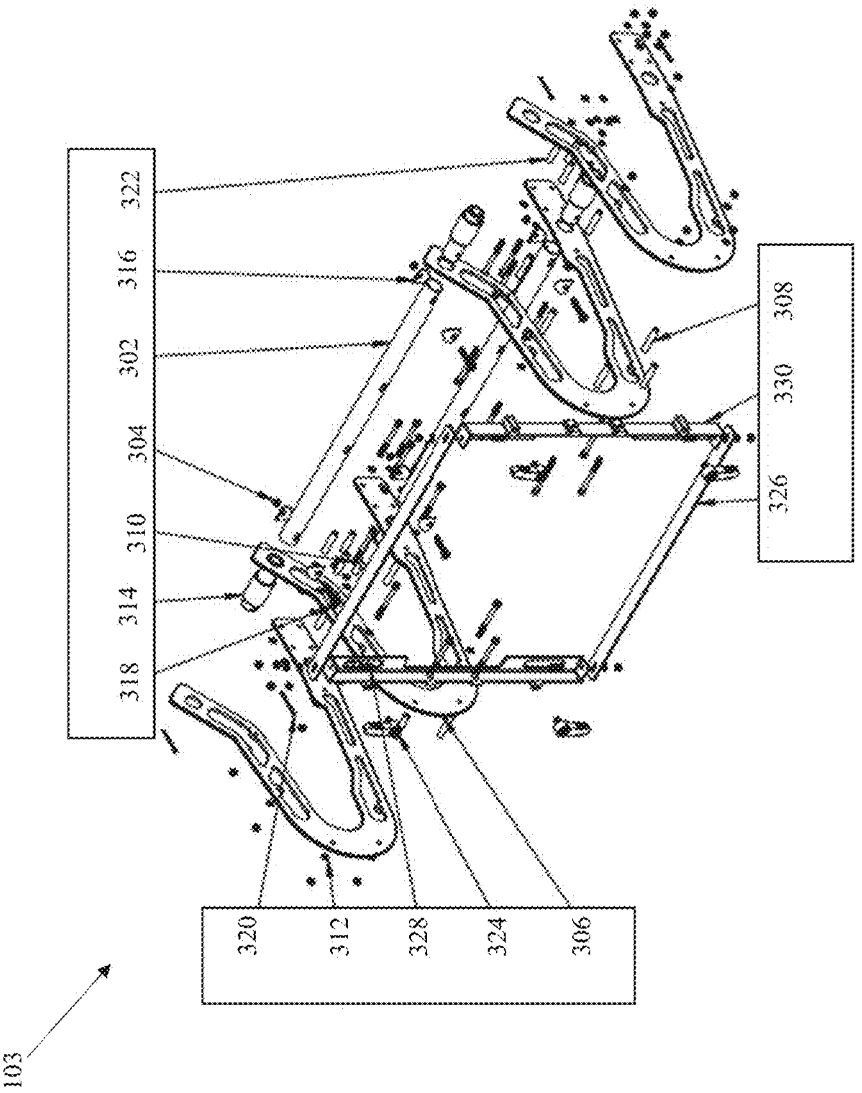
FIG. 3 illustrates an exploded view of insulation portion and metal frame portion of the frame of FIG. 2, in accordance with an aspect of the present disclosure.

FIG. 3 illustrates a compact view of the insulation portion 202 and the metal frame portion 206 of the frame 200 of FIG. 2, in accordance with an aspect of the present disclosure. The insulation portion 202 may include the one or more rod supports 302. The insulation portion 202 may further include a plurality of nylon-insert lock nuts 304 with M5×0.8-millimeter (mm) specification. Preferably, a numerical count of the nylon-insert lock nuts 304 may be twenty-eight. The metal frame portion 206 may include a plurality of DPLM (Drone Powerlines Mount) hooks 306. Preferably, a numerical count of the plurality of DPLM hooks 306 may be four. Furthermore, the metal frame portion 206 may include a plurality of unthreaded spacers 308 that may be made up of nylon and may have m5×40 mm specification. Preferably, a numerical count of the plurality of unthreaded spacers 308 may be twelve. Furthermore, the metal frame portion 206 may include a plurality of Socket Head Cap Screws (SHCS) 310 that may have m5×0.8, 60 mm LG, STL specification. Preferably, a numerical count of the plurality of SHCS 310 may be twenty. Furthermore, the metal frame portion 206 may include a plurality of washers 312 that may have m5, black oxide, SS specification. Preferably, a numerical count of the plurality of washers 312 may be fifty-six. Furthermore, the insulation portion 202 may include a rod connector 314 of DPLM specification. Preferably, a numerical count of the rod connector 314 may be four. Furthermore, the insulation portion 202 may include a plurality of curved washers 316 that may have ¼" screw, ø1 in tube OD, ZN specification. Preferably, a numerical count of the plurality of curved washers 316 may be eight. Furthermore, the metal frame portion 206 may include a plurality of BHS 318 that may be flanged and may have m5×0.8 mm, 35 mm specification. Preferably, a numerical count of the plurality of BHS 318 may be four. Furthermore, the metal frame portion 206 may include a plurality of cotter pins 320 that may be flanged and may have ø3.2 mm specification. Preferably, a numerical count of the plurality of cotter pins 320 may be four. Furthermore, the metal frame portion 206 may include a plurality of unthreaded spacers 322 that may have nylon, m5, 35 mm LG specification. Preferably, a numerical count of the plurality of unthreaded spacers 322 may be eight. Furthermore, the metal frame portion 206 may include a plurality of stud mounts 324 that may have turn latch, m6×1 mm specification. Preferably, a numerical count of the plurality of stud mounts 324 may be four. Furthermore, the metal frame portion 206 may include one or more armor holder braces 326 of DPLM specification. Preferably, a numerical count of the one or more armor holder braces 326 may be two. Furthermore, the metal frame portion 206 may include a plurality of SCHS 328 of low-profile, m5×0.8, 14 mm LG, STL specification. Preferably, a numerical count of the plurality of SCHS 328 may be four. Furthermore, the metal frame portion 206 may include one or more armor holders 330 of 1417-PLM (Powerlines Mount) specification. Preferably, a numerical count of the one or more armor holders 320 may be two.

Figure 4:
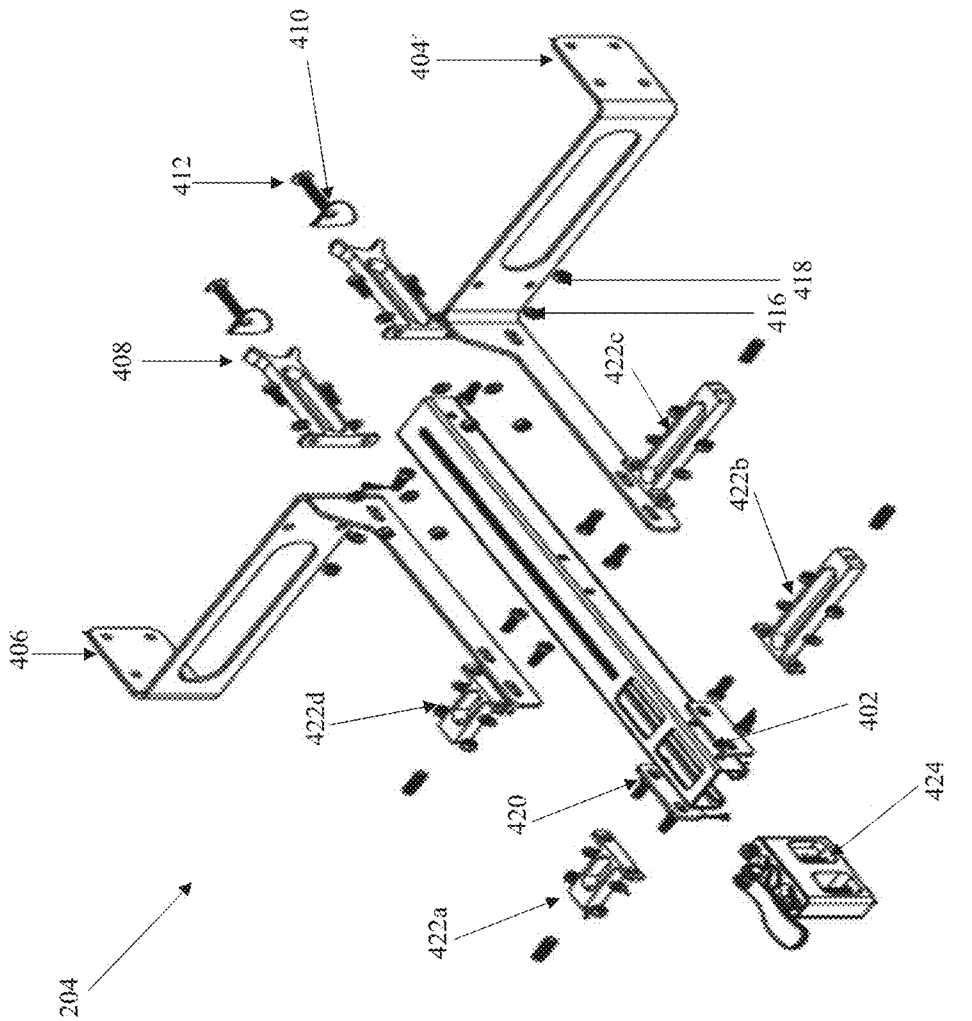
FIG. 4 illustrates an exploded view of a link coupled to the insulation portion of the frame of FIG. 2, in accordance with an exemplary aspect of the present disclosure.

FIG. 4 illustrates an exploded view of the link 204 coupled to the insulation portion 202 of the frame 200 of FIG. 2, in accordance with an exemplary aspect of the present disclosure. The link 204 may include a modified strut channel 402, a right offset rail 404 of DPLM specification, a left offset rail 406 of DPLM specification, one or more rail supports 408 of PLM specification, and a plurality of arms 422*a*-422*d*. Preferably, a numerical count of the one or more rail supports 408 may be two. The link 204 may include one or more curved washers 410 of ¼" screw, ø1 in tube OD, ZN specification. Preferably, a numerical count of the one or more curved washers 410 may be two. Furthermore, the link 204 may include one or more BHS 412, that may be flanged and may have m5×0.8 mm, 35 mm specification. Preferably, a numerical count of the one or more BHS 412 may be two. Furthermore, the link 204 may include a plurality of SHCS 414, that may have low-profile, m5×0.8, 14 mm LG, ST specification. Preferably, a numerical count of the plurality of SHCS 414 may be eight.

Furthermore, the link 204 may include a plurality of washers 416, that may have m5, black oxide, SS specification. Preferably, a numerical count of the plurality of washers 416 may be twelve. Furthermore, the link 204 may include a plurality of lock nuts 418, that may have nylon-insert, m5×0.8 mm specification. Preferably, a numerical count of the plurality of lock nuts 418 may be eight. Furthermore, the link 204 may include one or more strut end caps 420, that may have PLM specification. Preferably, a numerical count of the one or more strut end caps 420 may be two. Further, the link 204 may include a XRS-150 mounting kit 424 of PLM specification. Furthermore, the plurality of arms 422*a*-422*d* (hereinafter collectively referred to and designated as "the arms 422") may be adapted to couple a faraday cage 500 to the link 204.

Figure 5:
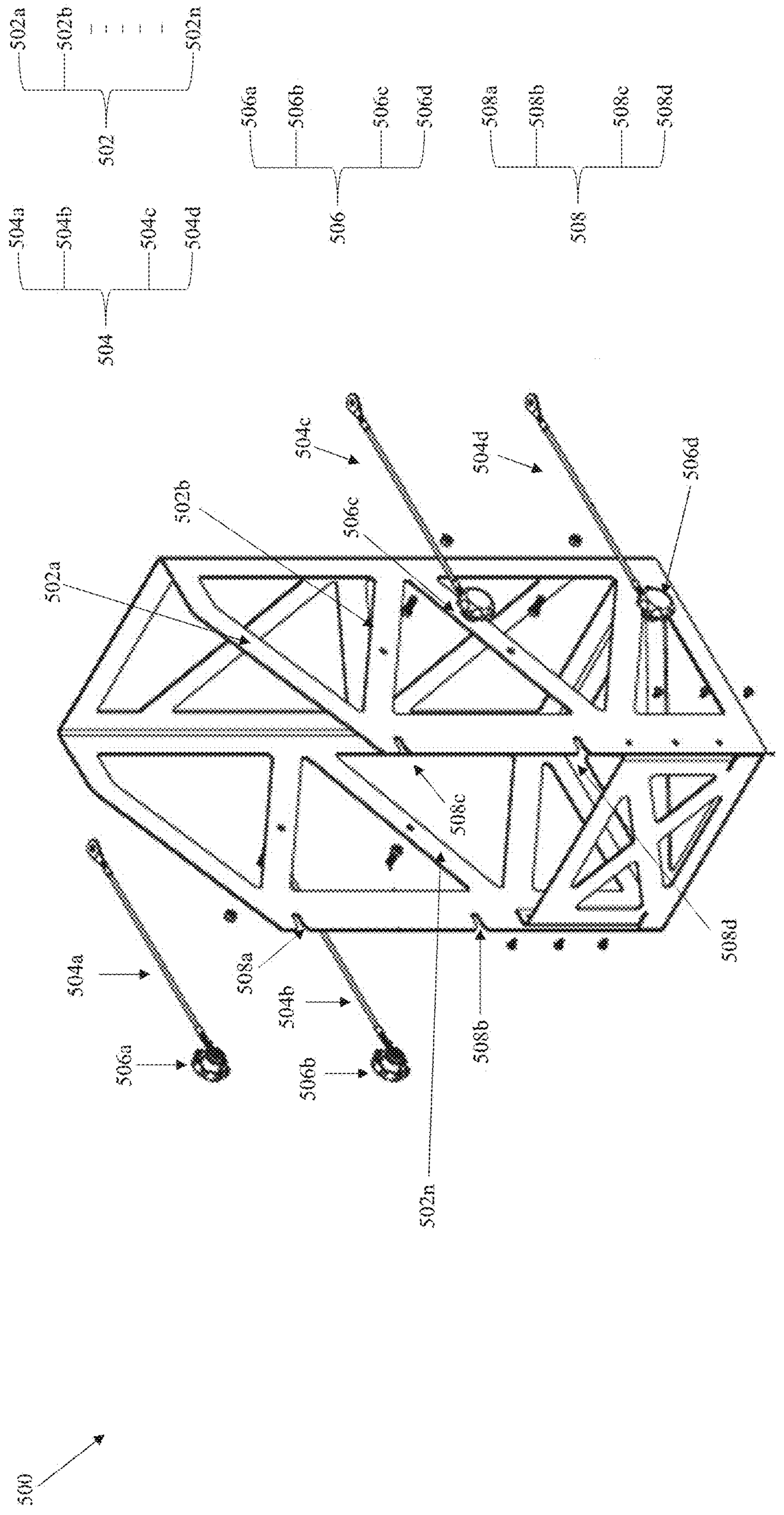
FIG. 5 illustrates a perspective view of a Faraday cage that is adapted to be coupled to the frame of the FIG. 2, in accordance with an exemplary aspect of the present disclosure.

FIG. 5 illustrates a perspective view of a Faraday cage 500 that is adapted to be coupled to the frame 103 of the FIG. 2, in accordance with an exemplary aspect of the present disclosure. The Faraday cage 500 may be an enclosure made of a conductive material that prevents electromagnetic interference (EMI) and blocks external static and non-static electric fields by channeling electricity along and around, but not through, the enclosure. The faraday cage 500 may therefore provide shielding effect for protecting electronic devices (e.g., X-ray unit 105) from EMI and thereby ensure correct operation of the electronic devices (e.g., X-ray unit 105) without interference from external electromagnetic fields. Specifically, the faraday cage 500 may be adapted to receive the X-ray generator 107. The faraday cage 500 may include a plurality of sheets 502*a*-502*n* (hereinafter referred to and designated as "the sheets 502") coupled to each other to exhibit a cage like structure. The faraday cage 500 may further include bars 504*a*-504*d* attached to the side portions of the faraday cage 500. Although FIG. 5 illustrates that the faraday cage includes four bars (i.e., bars 504*a*-504*d*), it will be apparent to a person skilled in the art that the scope of the present disclosure is not limited to it. In various other aspects, the receiver 102 may include any number of pair of legs without deviating from the scope of the present disclosure. In such a scenario, each bar is configured to perform one or more operations in a manner similar to the operations of the bars 504*a*-504*d* as described herein.

In some aspects of the present disclosure, the sheets 502 may include grooves 508*a*-508*d*. Further, the bars 504*a*-504*d* may include engaging portions 506*a*-506*d*. The grooves 508*a*-508*d* may be adapted to receive the engaging portions 506*a*-506*d* to couple the bars 504*a*-504*d* to the side portions of the sheets 502.

In some aspects of the present disclosure, the bars 504*a*-504*d* and the sheets 502 may be made up of metals that may include but not limited to copper, iron, aluminum, or any combination thereof. Aspects of the present disclosure are intended to include and/or otherwise cover all types of conductive materials, without deviating from the scope of the present disclosure.

Figure 6:
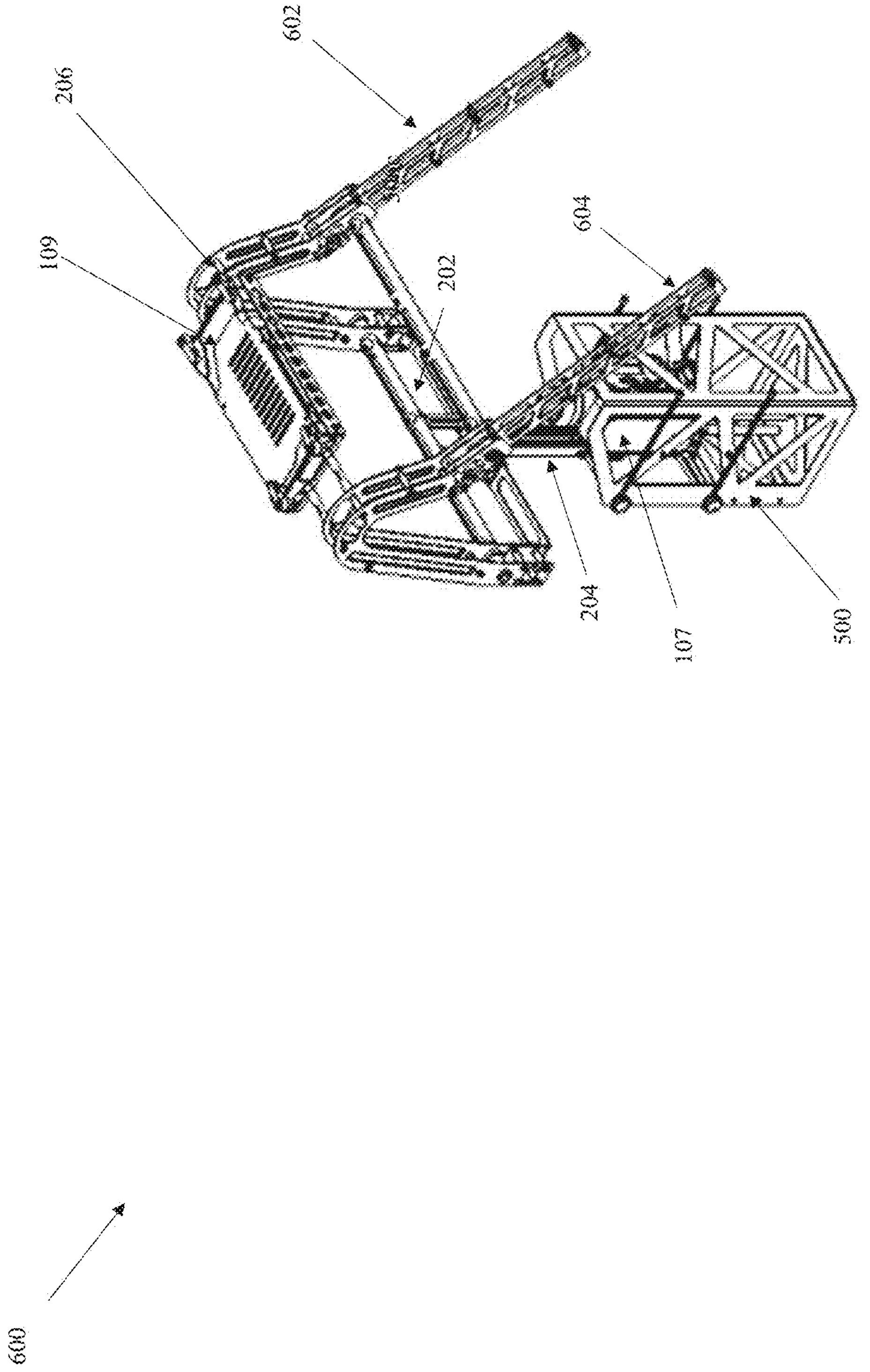
FIG. 6 illustrates a perspective view of an assembly of the frame with the faraday cage, in accordance with an exemplary aspect of the present disclosure.

FIG. 6 illustrates a perspective view of an assembly 600 of the frame 103 with the faraday cage 500, in accordance with an exemplary aspect of the present disclosure. As illustrated in FIG. 6, the faraday cage 500 may be coupled to the link 204. Specifically, the faraday cage 500 may be coupled to the link 204 by coupling the engaging portions 506*a*-506*d* of the bars 504*a*-504*d* with the arms 422*a*-422*d* of the link 204. The coupling the faraday cage 500 with the link 204 thereby facilitates in enclosing the X-ray generator 107 with in the faraday cage 500 and prevent the faraday cage 500 from the electromagnetic interference. Further, the assembly 600 may include hook extensions 602 and 604. The hook may be attached to the metal frame portions 206 for extending the length of the metal frame portions 206. Although FIG. 6 illustrates that the metal frame portions 206 includes two hook extensions (i.e., the hook extensions 602 and 604), it will be apparent to a person skilled in the art that the scope of the present disclosure is not limited to it. In various other aspects, the metal frame portions 206 may include any number of hook extensions without deviating from the scope of the present disclosure. In such a scenario, each hook extension is configured to perform one or more operations in a manner similar to the operations of the hook extensions 602 and 604 as described herein.

Figure 7:
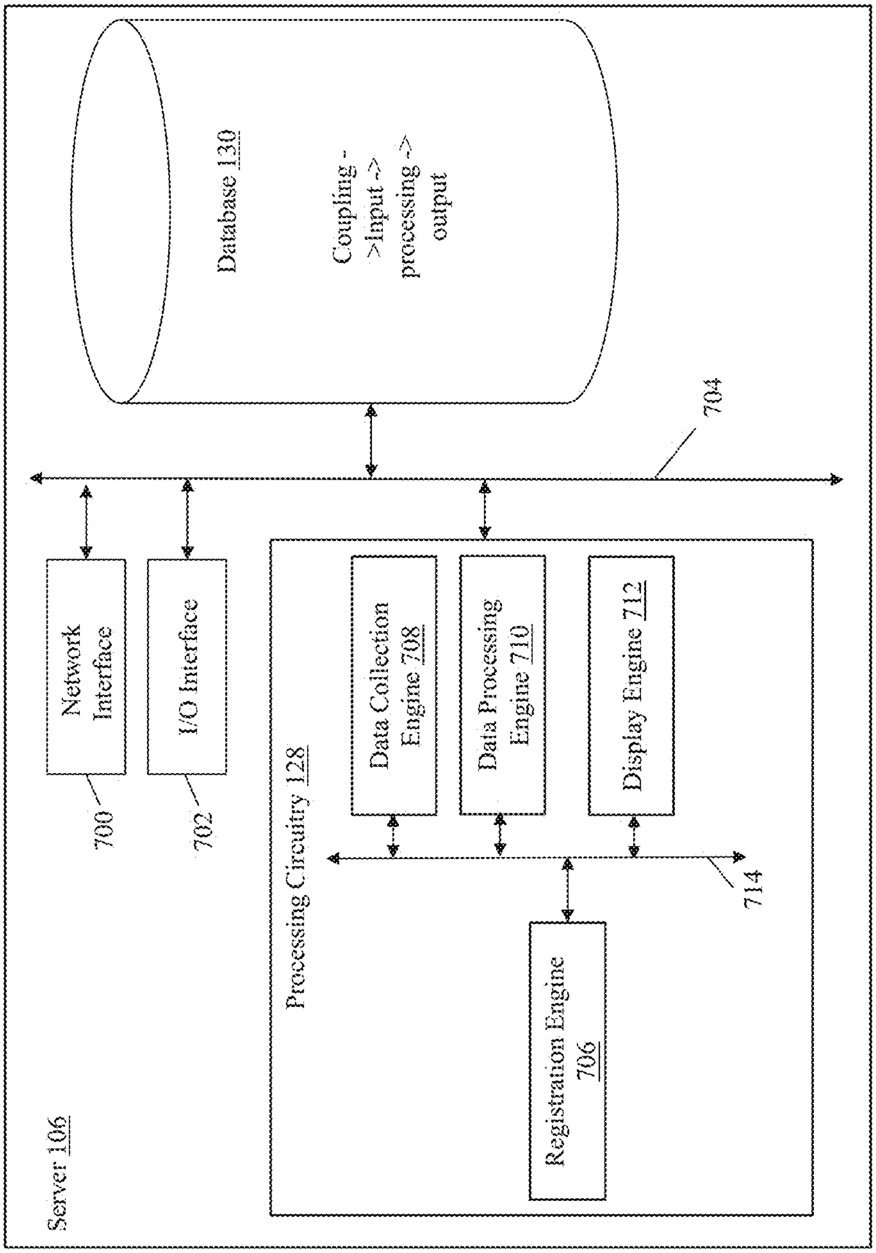
FIG. 7 is a block diagram that illustrates the server of the system of FIG. 1, in accordance with an aspect of the present disclosure.

FIG. 7 is a block diagram that illustrates the server 106 of FIG. 1, in accordance with an aspect of the present disclosure. As discussed, the server 106 includes the processing circuitry 128 and the database 130. Further, the server 106 may include a network interface 700 and an input/output (I/O) interface 702. The processing circuitry 128, the database 130, the network interface 700, and the I/O interface 702 may communicate with each other by way of a first communication bus 704. In some embodiments of the present disclosure, the processing circuitry 128 may include a registration engine 706, a data collection engine 708, a data processing engine 710, and a display engine 712. The registration engine 706, the data collection engine 708, the data processing engine 710, and the display engine 712 may communicate with each other by way of a second communication bus 714. It will be apparent to a person having ordinary skill in the art that the server 106 is for illustrative purposes and not limited to any specific combination of hardware circuitry and/or software.

The network interface 700 may include suitable logic, circuitry, and interfaces that may be configured to establish and enable a communication between the server 106 and different components of the system 100 (e.g., the user device 102 and the drone unit 104), via the communication network 108. The network interface 700 may be implemented by use of various known technologies to support wired or wireless communication of the server 106 with the communication network 108. The network interface 700 may include, but is not limited to, an antenna, a RF transceiver, one or more amplifiers, a tuner, one or more oscillators, a digital signal processor, a CODEC chipset, a SIM card, and a local buffer circuit.

The I/O interface 702 may include suitable logic, circuitry, interfaces, and/or code that may be configured to receive inputs and transmit server outputs (i.e., one or more outputs generated by the server 106) via a plurality of data ports in the server 106. The I/O interface 702 may include various input and output data ports for different I/O devices. Examples of such I/O devices may include, but are not limited to, a touch screen, a keyboard, a mouse, a joystick, a projector audio output, a microphone, an image-capture device, a liquid crystal display (LCD) screen and/or a speaker.

The processing circuitry 128 may be configured to perform one or more operations associated with the system 100 by way of the registration engine 706, the data collection engine 708, the data processing engine 710, and the display engine 712. In some aspects of the present disclosure, the registration engine 706 may be configured to enable the user to register into the system 100 by providing registration data through a registration menu (not shown) displayed through the user device 102. In some embodiments, the registration engine 706 may be further configured to enable the user to create a login identifier and a password that may enable the user to subsequently login into the system 100. The registration engine 706 may be configured to store the registration data associated with the user, the login and the password associated with the user in a Look Up Table (LUT) (not shown) provided in the database 130.

The data collection engine 708 may be configured to receive the one or more data from the user device 102. Specifically, the data collection engine 708 may be configured to receive the one or more X-ray images of the powerlines from the user device 102 in the digital imaging and communication in non-destructive evaluation (DICONDE) format. In some aspects of the present disclosure, the data collection engine 708 may be configured to store the one or more X-ray images of the powerlines into the database 130. In some aspects of the present disclosure, the data collection engine 708 may be configured to provide the one or more X-ray images of the powerlines to the data processing engine 710 in digital imaging and communication in non-destructive evaluation (DICONDE) format.

The data processing engine 710 may be configured to receive the one or more X-ray images of the powerlines from the data collection engine 708 in digital imaging and communication in non-destructive evaluation (DICONDE) format. In some aspects of the present disclosure, the data processing engine 710 may be configured to process the one or more X-ray images of the powerlines by way of a picture archiving & communication system (PACS) and an assistive defect recognition (ADR) technique. The data processing engine 710 may further be configured to determine one or more abnormalities associated with the powerlines by way of PACS an assistive defect recognition (ADR) technique. Further, the data processing engine 710 may be configured to generate a report based on the one or more abnormalities by way of PACS. Furthermore, the data processing engine 710 may be configured to provide the generated report to the display engine 712.

The display engine 712 may be configured to receive the generated report from the data processing engine 710. The display engine 712 may be configured to generate a display signal in real time that includes the generated report and further transmit the display signal to the user device 102. The display signal may enable the user device 102 to display the report embedded in the display signal by way of the first communication interface 118.

Figure 8:
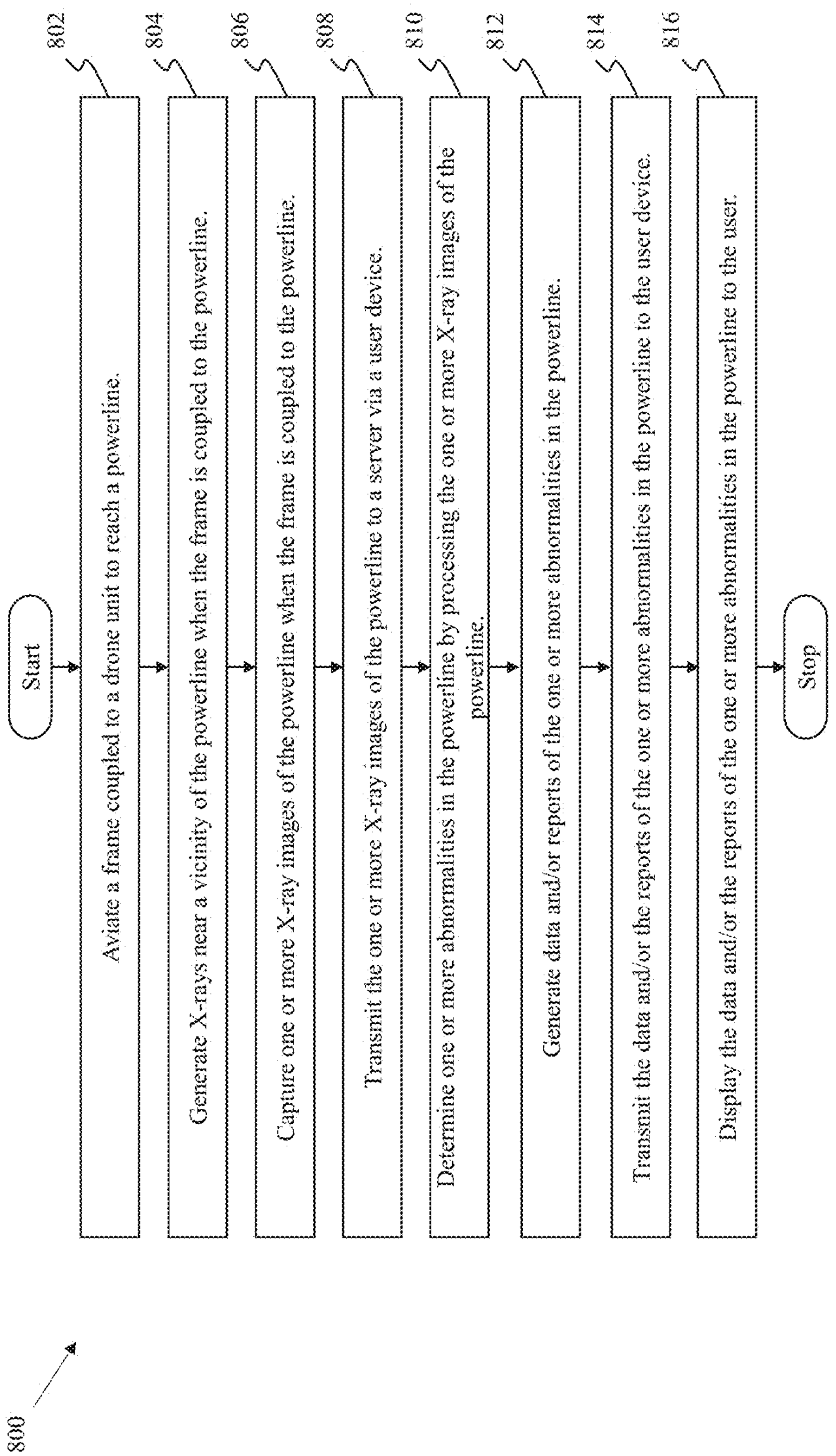
FIG. 8 illustrates a flow chart of a method for powerline inspection, in accordance with an exemplary aspect of the present disclosure.

FIG. 8 illustrates a flow chart of a method 700 for the powerlines inspection by the system 100 of FIG. 1, in accordance with an exemplary aspect of the present disclosure.

At step 802, the system 100 may aviate the drone unit 104 that is adapted to be detachably coupled to the frame 103 and, configured to reach to the vicinity of the powerlines and detachably couple the frame 103 to the one or more powerlines. In some aspects of the present disclosure, the user device 102 may generate the one or more instructions to aviate the drone unit 104 detachably coupled to the frame 103 to reach the vicinity of the powerlines.

At step 804, the system 100 may generate the X-rays near the vicinity of the powerlines by way of the at least one X-ray generator 107 when the frame 103 is detachably coupled to the powerlines.

At step 806, the system 100 may capture the one or more X-ray images of the powerlines by way of the at least one digital detector 109 when the frame 103 is detachably coupled to the powerlines.

At step 808, the system 100 may transmit the one or more X-ray images of the powerlines to the server 106 via the user device 106.

At step 810, the system 100 may determine the one or more abnormalities in the powerlines by processing the one or more X-ray images of the powerlines. In some aspects of the present disclosure, the server 106 may determine the one or more abnormalities in the powerlines by processing the one or more X-ray images of the powerlines using PACS and the assistive defect recognition (ADR) techniques.

At step 812, the system 100 may generate the data and/or the reports of the one or more abnormalities in the powerlines.

At step 814, the system 100 may transmit the data and/or the reports of the one or more abnormalities in the powerlines to the user device 102.

At step 816, the system 100 may display (or present) the data and/or the reports of the one or more abnormalities in the powerlines to the user by way of user device 102.

Thus, the system 100 and the method 800 provides a fast, safe and effective way for powerlines inspection. The system 100 and the method 800 provides inspection of powerlines made up of one or more of ACSR (Aluminum Conductor Steel Reinforced cable), ACCR (Aluminum Conductor Composite Reinforced cable) or AAAC (All Aluminum Alloy Conductor), and the like. Further, the system 100 and the method 800 facilitate capturing the one or more X-ray images of the powerlines stably using the frame 103 that gets detachably coupled to the powerlines while capturing the one or more X-ray images by way of the X-ray unit 105. The system 100 and the method 800 further provide inspection of both energized and de-energized powerlines. Furthermore, using an unmanned vehicle (i.e., the drone unit 104), the system minimizes the risk & therefore, provides protection to personnel. Further, the system 100 and the method 800 does not require a person with extraordinary skill for the inspection of powerlines.

The foregoing discussion of the present disclosure has been presented for purposes of illustration and description. It is not intended to limit the present disclosure to the form or forms disclosed herein. In the foregoing Detailed Description, for example, various features of the present disclosure are grouped together in one or more aspects, configurations, or aspects for the purpose of streamlining the disclosure. The features of the aspects, configurations, or aspects may be combined in alternate aspects, configurations, or aspects other than those discussed above. This method of disclosure is not to be interpreted as reflecting an intention that the present disclosure requires more features than are expressly recited in each aspect. Rather, as the following aspects reflect, inventive aspects lie in less than all features of a single foregoing disclosed aspect, configuration, or aspect. Thus, the following aspects are hereby incorporated into this Detailed Description, with each aspect standing on its own as a separate aspect of the present disclosure.

Moreover, though the description of the present disclosure has included description of one or more aspects, configurations, or aspects and certain variations and modifications, other variations, combinations, and modifications are within the scope of the present disclosure, e.g., as may be within the skill and knowledge of those in the art, after understanding the present disclosure. It is intended to obtain rights which include alternative aspects, configurations, or aspects to the extent permitted, including alternate, interchangeable and/or equivalent structures, functions, ranges or steps to those disclosed, whether or not such alternate, interchangeable and/or equivalent structures, functions, ranges or steps are disclosed herein, and without intending to publicly dedicate any patentable subject matter.

As one skilled in the art will appreciate, the system 100 includes a number of functional blocks in the form of a number of units and/or engines. The functionality of each unit and/or engine goes beyond merely finding one or more computer algorithms to carry out one or more procedures and/or methods in the form of a predefined sequential manner, rather each engine explores adding up and/or obtaining one or more objectives contributing to an overall functionality of the system 100. Each unit and/or engine may not be limited to an algorithmic and/or coded form, rather may be implemented by way of one or more hardware elements operating together to achieve one or more objectives contributing to the overall functionality of the system 100. Further, as it will be readily apparent to those skilled in the art, all the steps, methods and/or procedures of the system 100 are generic and procedural in nature and are not specific and sequential.

Certain terms are used throughout the following description and aspects to refer to particular features or components. As one skilled in the art will appreciate, different persons may refer to the same feature or component by different names. This document does not intend to distinguish between components or features that differ in name but not structure or function. While various aspects of the present disclosure have been illustrated and described, it will be clear that the present disclosure is not limited to these aspects only. Numerous modifications, changes, variations, substitutions, and equivalents will be apparent to those skilled in the art, without departing from the spirit and scope of the present disclosure.

What is claimed is:

1. A system comprising:

a frame adapted to be detachably coupled to one or more powerlines, wherein the frame comprising at least one X-ray unit configured to capture one or more X-ray images of the one or more powerlines;

one or more unmanned aerial vehicles (UAVs) that is adapted to be detachably coupled to the frame, and configured to aviate the frame to reach a vicinity of the one or more powerlines and detachably couple the frame to the one or more powerlines;

processing circuitry that is coupled to the at least one X-ray unit and the one or more unmanned aerial vehicles, and configured to: (i) process the one or more X-ray images by way of a picture archiving & communication system (PACS) and an assistive defect recognition (ADR) technique to determine one or more abnormalities associated with the one or more powerlines; and (ii) generate a report based on the one or more abnormalities by way of the picture archiving & communication system (PACS).

2. The system of claim 1, further comprising a user device that is coupled to the at least one X-ray unit, the one or more UAVs, and the processing circuitry, and configured to receive the one or more X-ray images and transmit the one or more X-ray images to the processing circuitry in a digital imaging and communication in non-destructive evaluation (DICONDE) format.

3. The system of claim 2, wherein the user device is further configured to enable a user to provide instructions to the one or more UAVs to reach near the vicinity of the one or more powerlines to detachably couple the frame to the one or more powerlines.

4. The system of claim 2, wherein the user device is further configured to receive the report.

5. The system of claim 1, wherein the one or more abnormalities comprising one of, broken spring fragments, detached core sleeves, spiral fractures, implosive splice fracture, cracks, voids, missing grease, or air pockets.

6. The system of claim 1, wherein the at least one X-ray unit comprising at least one X-ray generator that is configured to (i) generate a plurality of X-rays and (ii) transmit the plurality of X-rays to the one or more power lines.

7. The system of claim 1, wherein the at least one X-ray unit further comprising at least one digital detector that is configured to (i) capture the plurality of X-rays passed through the one or more power lines and (ii) generate the one or more X-ray images in the DICONDE format.

8. The system of claim 1, wherein the frame further comprising (i) an insulation portion that is adapted to be coupled to the at least one X-ray generator and (ii) a metal frame portion that is adapted to be coupled to the at least one digital detector.

9. A computer-implemented method comprising:

aviating, by way of one or more unmanned aerial vehicles (UAVs) detachably coupled to a frame, the frame to reach a vicinity of the one or more powerlines for coupling the frame to the one or more powerlines and detachably couple the frame to the one or more powerlines wherein the frame comprising at least one X-ray unit configured to capture one or more X-ray images of the one or more powerlines;

processing, by way of processing circuitry that is coupled to the one or more UAVs and the least one X-ray unit, the one or more X-ray images via a picture archiving & communication system (PACS) and an assistive defect recognition (ADR) technique;

determining, by way of the processing circuitry, one or more abnormalities associated with the one or more powerlines via a picture archiving & communication system (PACS) and the assistive defect recognition (ADR) technique; and generating, by way of the processing circuitry, a report based on the one or more abnormalities via the picture archiving & communication system (PACS).

10. The method of claim 9, further comprising:

instructing, by way of a user device coupled to the at least one X-ray unit, the one or more UAVs, and the processing circuitry, to aviate the frame to reach near the vicinity of the one or more powerlines to detachably couple the frame to the one or more powerlines;

receiving, by way of the user device, the one or more X-ray images; and transmitting, by way of the user device, the one or more X-ray images to the processing circuitry in a digital imaging and communication in a non-destructive evaluation (DICONDE) format.

11. The method of claim 9, further comprising receiving, by way of the user device, the report.

* * * * *